United States Patent
Yoakim et al.

(10) Patent No.: US 9,560,932 B2
(45) Date of Patent: Feb. 7, 2017

(54) METHOD, MEDIUM, AND SYSTEM FOR A BEVERAGE PREPARATION MACHINE WITH VIRTUAL SHOPPING FUNCTIONALITY

(75) Inventors: Alfred Yoakim, St-legier-la Chiesaz (CH); Fabien Ludovic Agon, Le Bouveret (CH)

(73) Assignee: Nestec S.A., Vevey (CH)

( * ) Notice: Subject to any disclaimer, the term of this patent is extended or adjusted under 35 U.S.C. 154(b) by 424 days.

(21) Appl. No.: 13/513,770

(22) PCT Filed: Nov. 29, 2010

(86) PCT No.: PCT/EP2010/068364
§ 371 (c)(1),
(2), (4) Date: Jun. 4, 2012

(87) PCT Pub. No.: WO2011/067191
PCT Pub. Date: Jun. 9, 2011

(65) Prior Publication Data
US 2012/0253993 A1    Oct. 4, 2012

(30) Foreign Application Priority Data
Dec. 2, 2009 (EP) .................................... 09177739

(51) Int. Cl.
*G06Q 30/00* (2012.01)
*A47J 31/52* (2006.01)
*A47J 31/40* (2006.01)

(52) U.S. Cl.
CPC ............... *A47J 31/52* (2013.01); *A47J 31/407* (2013.01)

(58) Field of Classification Search
CPC ... B67D 1/0004; B67D 1/0016; B67D 1/0041; G06Q 30/0641; G06Q 30/0643; A47J 31/52; A47J 31/407

(Continued)

(56) References Cited

U.S. PATENT DOCUMENTS

| 4,954,697 A | 9/1990 | Kokubun et al. |
| 5,848,399 A * | 12/1998 | Burke ............... G06Q 10/087 235/383 |

(Continued)

FOREIGN PATENT DOCUMENTS

| DE | 202005019039 | 4/2007 |
| EP | 2085000 | 1/2008 |

(Continued)

OTHER PUBLICATIONS

Nov. 2008—http://web.archive.org/web/20081118140112/http://www.irishmerchants.com/irishmerchants/Main/coffee-kenco-singleBrewer.htm.*

(Continued)

*Primary Examiner* — Matthew Zimmerman
(74) *Attorney, Agent, or Firm* — K&L Gates LLP (57) ABSTRACT

The present invention relates to beverage preparation machine (1) with a virtual shopping functionality. The machine comprises a touch screen (10) and a control unit (21). The touch screen (10) is adapted to display an image (80) of the interior of a shop offering goods (81) related to the machine (1) on the touch screen (10), to display an image of a container (82) on said touch screen (10), and to submit information on a touch operation to the control unit (21). The displayed interior corresponds to the interior of a physical shop offering said goods (81), in particular to the interior of a shop of a chain of physical shops having a standardized presentation of said goods (81). The control unit (21) is adapted to accept selection of a good (81) for purchase upon detecting a touch operation on a good (81) on the touch screen (10) and on the container (82) on the touch screen (10).

14 Claims, 6 Drawing Sheets

(58) Field of Classification Search
USPC .............................................. 705/26.1, 27.2
See application file for complete search history.

(56) References Cited

U.S. PATENT DOCUMENTS

| | | | |
|---|---|---|---|
| 6,026,376 A | 2/2000 | Kenney | |
| 6,381,583 B1 * | 4/2002 | Kenney | G06Q 20/02 |
| | | | 705/26.41 |
| 6,590,568 B1 * | 7/2003 | Astala | G06F 3/0486 |
| | | | 178/18.01 |
| 6,759,072 B1 * | 7/2004 | Gutwein | A23F 5/243 |
| | | | 426/429 |
| 7,721,103 B2 * | 5/2010 | Risan | H04L 63/062 |
| | | | 709/217 |
| 2001/0007979 A1 * | 7/2001 | Teshima | G06Q 10/08 |
| | | | 705/23 |
| 2003/0079613 A1 * | 5/2003 | Williamson | A47J 31/52 |
| | | | 99/282 |
| 2005/0150393 A1 | 7/2005 | Biderman et al. | |
| 2005/0177463 A1 * | 8/2005 | Crutchfield, Jr. | G06Q 30/06 |
| | | | 705/26.9 |
| 2007/0136093 A1 * | 6/2007 | Rankin | G06F 19/3431 |
| | | | 705/2 |
| 2007/0271149 A1 * | 11/2007 | Siegel | G06Q 30/0603 |
| | | | 705/26.41 |
| 2008/0017042 A1 * | 1/2008 | Almblad | A47J 31/007 |
| | | | 99/280 |
| 2010/0030578 A1 * | 2/2010 | Siddique | G06Q 10/0637 |
| | | | 705/3 |

FOREIGN PATENT DOCUMENTS

| | | | | |
|---|---|---|---|---|
| IT | WO 2009016490 A2 * | 2/2009 | | G07F 9/02 |
| WO | 0169364 | 9/2001 | | |
| WO | 03/037150 A1 | 5/2003 | | |
| WO | 2006/090183 A2 | 8/2006 | | |
| WO | 2007003062 | 1/2007 | | |
| WO | 2007014584 | 2/2007 | | |
| WO | 2008081411 | 7/2008 | | |
| WO | 2008138710 | 11/2008 | | |
| WO | 2009016490 | 2/2009 | | |

OTHER PUBLICATIONS

Written Opinion and International Search Report issued Feb. 25, 2011 for corresponding Intl. Appln. No. PCT/EP2010/068364.

* cited by examiner

METHOD, MEDIUM, AND SYSTEM FOR A BEVERAGE PREPARATION MACHINE WITH VIRTUAL SHOPPING FUNCTIONALITY

CROSS REFERENCE TO RELATED APPLICATIONS

The present application is a National Stage of International Application No. PCT/EP2010/068364, filed on Nov. 29, 2010, which claims priority to European Patent Application No. 09177739.1, filed on Dec 2, 2009, the entire contents of which are being incorporated herein by reference.

FIELD OF THE INVENTION

The field of the invention relates to a beverage preparation machine with a virtual shopping functionality, to a program stored on a memory device for providing a virtual shopping functionality when executed and to a method for operating server being in communication with a beverage preparation machine with a virtual shopping functionality.

For the purpose of the present description, a "beverage" is meant to include any liquid food, such as tea, coffee, hot or cold chocolate, milk, soup, baby food or the like. A "capsule" is meant to include any pre-portioned beverage ingredient within an enclosing packaging of any material, in particular an air tight packaging, e. g. plastic, aluminum, recyclable and/or bio-degradable packaging and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee or other beverage preparation machines possess filling means that include a pump for liquid, usually water, which pumps the liquid from a source of water that is cold or indeed heated through heating means, such as a heating resistor, a thermoblock or the like. Such filling means are usually controlled via a control unit of the machine, typically including a printed circuit board with a controller.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 302 138, EP 1 448 084, EP 1 676 509, EP 08155851.2, FR 2 624 844, GB 2 397 510, U.S. Pat. Nos. 4,377,049, 4,458,735, 4,554, 419, 4,767,632, 4,954,697, 5,312,020, 5,335,705, 5,372,061, 5,375,508, 5,731,981, 5,645,230, 5,836,236, 5,959,869, 6,182,555,. 6,354,341, 6,759,072, US 2007/0157820, WO 97/25634, WO99/50172, WO 2004/030435, WO 2004/ 030438, WO 2006/063645, WO 2006/090183, WO 2007/ 003062, WO 2007/003990, WO 2008/104751, WO 2008/ 138710, WO 2008/138820 and WO 2009/016490.

Today's beverage preparation machines provide an increasing number of different functions going even beyond the pure preparation of the beverage. Consequently, a large scale of different products and/or accessories related to the beverage preparation machine is provided. The known beverage preparation machines suffer from the disadvantage, that purchase and order of machine related products for the user is time consuming and laborious. When noticing the need for a machine related product, the user has to personally visit a corresponding store or has to access an internet shop via any other device. Moreover, internet shops are conceptually and visually organized in a way requiring the user to adapt its behavior to the ordering workflows of these specific environments.

Consequently, there is still a need to improve the user's experience, and in particular to provide a solution to purchase and order beverage preparation machine related products in a more familiar, seamless and time efficient way for the user.

SUMMARY OF THE INVENTION

It is therefore and object of the present invention to improve the prior art.

It is a preferred object of the present invention to provide a beverage preparation machine with a virtual shopping functionality, which is comfortable and user-friendly. More specifically, it is an object to provide a menu structure which reduces the efforts of the user when purchasing a machine related good. Further, it is an object of the present invention to make the purchase of the good simple and intuitive.

According to a first aspect, the present invention relates to a beverage preparation machine with a virtual shopping functionality, comprising a touch screen, and a control unit, wherein the touch screen is configured to display an image of the interior of a shop offering goods related to the machine on the touch screen, to display an image of a container on said touch screen, and to submit information on a touch operation to the control unit, and the control unit is configured to accept selection of a good for purchase upon detecting a touch operation on the graphical representation of a good on the touch screen and on the graphical representation of the container on the touch screen.

In particular, by displaying an image of the interior of the shop and of the container, the ergonomic and the ease of the ordering workflow are greatly enhanced. More specifically, the virtual shopping environment may be created by representing the typical interior of a shop offering goods related to machine, and by displaying a container in the shape of a shopping bag. Generally speaking, it is possible to recreate, on the beverage machine, a virtual environment that may be recognized by the user and that he can easily and efficiently interact with. The differences experienced by the user when he goes to an actual store to buy machine related goods, or when he uses the machine to buy the same kind of goods, are then reduced. Moreover, the user can reproduce physical interactions using the touch screen of the machine that he would have performed in a real shop. For example, when touching a displayed good on the display and further touching container, the user may add the corresponding good to his shopping bag and thus to a list of goods he intends to purchase. He thereby has the impression of directly taking the good out of the shelf represented in the virtual environment or any other part of the shop and putting it into his container or shopping bag. Furthermore this high level of interactions is proposed directly to the user on the machine. It is not required anymore that the user has access to, had already configured properly, and uses correctly another additional external device such a computer. The ease and the seamless character of the ordering process are then enhanced.

According to a further aspect, the present invention is related to a for operating a server being via a communication network in communication with such a beverage preparation machine having a virtual shopping functionality, comprising the steps of receiving from the beverage preparation machine a purchase request for at least one good entered at the beverage preparation machine.

The present invention further relates to a program stored on a memory device and executable by a control unit of a beverage preparation machine, in particular according to any preceding claim, for providing virtual shopping functionality, wherein said program when being executed is arranged to perform the steps of displaying an image of the interior of a shop offering goods related to the machine on a touch screen of the machine, accepting selection of a good for purchase by a touch operation on the touch screen, wherein said interior of a shop offering goods related to the machine corresponds to the interior of a physical shop offering said goods, in particular to the interior of a shop of a chain of physical shops having a standardized presentation of said goods. This program for providing virtual shopping functionality comprises electronic data-processing program code instructions, intended to be executed by a processing unit such a processor or a controller. Consequently, the invention relates also to programs on an information support, for providing virtual shopping functionality. These programs may use any programming language, and may be in the form of source code, object code, or intermediate code between source code and object code, such partially compiled code, or any suitable other form.

The invention relates also to an information support readable by a beverage machine, and on which are stored instructions of the programs as mentioned above. The information support may be any suitable device capable of storing said programs. For example, it may comprise storage means, comprising a CD-ROM, USB key, FLASH memories, or a ROM of a microelectronic circuit, or a magnetic storing means, like a floppy or hard drive. Moreover, the information support may be a transmissible support, such as an electrical or optical signal, which can be transported by an optical or electrical wire, by radiofrequency means or by any suitable coupling means. The program may be in particular downloaded from a network connected to Internet.

The information support may also be an integrated circuit in which the programs are incorporated, the circuit being adapted to execute or to be used to execute this program.

Further features, advantages and objects of the present invention will become evident by means of the figures of the enclosed drawings as well as by the following detailed explanation of illustrative-only embodiments of the present invention.

BRIEF DESCRIPTION OF THE DRAWINGS

The invention will now be described with reference to schematic drawings, wherein.

DETAILED DESCRIPTION

The machine according to the present invention can be a coffee, tea or soup machine, in particular a machine for supplying a beverage or liquid food by passing hot or cold water or another liquid through a capsule containing an ingredient of the beverage or liquid food to be supplied, such as ground coffee.

For example, the preparation machine comprises: an ingredient processing arrangement including one or more of a liquid reservoir, liquid circulation circuit, a heater, a pump and a beverage preparation unit arranged to receive capsules for use and evacuate capsules upon use; a housing having an opening leading into a seat to which capsules are evacuated from the preparation unit; and a receptacle having a cavity forming a storage space for collecting capsules evacuated to the seat into the receptacle to a level of fill. The receptacle is insertable into the seat for collecting capsules and is removable from the seat for emptying the collected capsules. Examples of such ingredient processing arrangements are disclosed in WO 2009/074550 and in WO 2009/130099, which are incorporated herein by reference.

The machine may include an interface as described in PCT/EP09/058540 and/or be in a network for reordering capsules as described in EP 09169800.1.

The machine may comprise a user-interface screen for providing information to the user and/or for accepting input by the user. The user-interface screen can be a touch-sensitive screen and/or comprise touch-sensitive input parts. The machine may have a user-input device, such as a touch pad, one or more buttons and/or switches or similar devices known in the art. The user-interface screen can be stylus sensitive.

A stylus may for instance be used to select predefined options displayed on the interface-screen or to write notes and messages on the user-interface screen that may be stored by the machine and re-accessible later. Hence, the screen may be used as a substitution for a post-it. Hereby, it may be possible to select different colors when writing on the screen.

According to the present invention, the liquid food or beverage preparation machine has an interface for connection to a remote network, such as a network for accessing remote data displayable on the user-interface screen and/or for transferring local data acquired via the user interface screen, in particular a network for: supplying visual and/or audio information in relation with a liquid food or beverage that can be requested by the user; and/or for ordering, in particular from a remote supplier, goods such as liquid food or beverage ingredients or a service related to this machine by using the user-interface screen.

Hence, the user may be given the technical possibility to order directly through the beverage preparation machine liquid food or beverage ingredients that are missing or at a low level, or request directly through this machine the most up to date information on a particular item, in particular a liquid food or beverage he has requested or intends to request the machine to prepare or order from the supplier.

Moreover, the user-interface screen can be arranged to perform at least one function selected from: displaying information to the user regarding a parameter of the machine that requires a user intervention, displaying locally stored and/or remotely emitted graphic or text matter, a notepad function, and a visual ambiance generator, for instance by displaying appropriate pictures or moving colour shapes, for instance of the screen-saver type.

In order to noticeably affect the ambiance surrounding the machine by visual effects, the user-screen has to dominate the user-visible part of the machine. An interface screen of small size and/or lost somewhere on the user-visible part of the machine will not provide an optimal ambiance effect.

Furthermore, the liquid food or beverage preparation machine may include a sound input and/or output device. The sound device can be arranged to cooperate with the user-interface screen, in particular a sound device arranged to cooperate functionally with the screen, such as a sound device for providing melodic acoustic feed back in reaction to a user-input on the user-interface screen and/or cooperating with the screen so that harmonious visual feed-back is generated on the user-interface screen in reaction to an audio signal. The sound device may include a voice recognition arrangement so as to be able to receive vocal user-commands and/or to link a particular user profile from a voice analysis.

For example, the user-interface screen may be arranged to display a movie, news, weather forecast, stock exchange information or anything alike while the machine is preparing a liquid food or beverage, so that the user does not have to wait until the liquid food or beverage is prepared to move on to such activities but can do them right from the beginning, with a comfortable interface screen whose functionalities go significantly beyond mere input and/or output of data.

Such liquid food or beverage preparation machines are particularly handy for preparing a liquid food or beverage during an on-going broadcasted radio or TV program. The user may thus get himself a liquid food or beverage while he is following such a program on an ordinary TV or radio and still continue to follow the program on the beverage preparation machine. Hence, the user will not be attempted to wait the end of the program or an advertising break. The beverage preparation machine may include a receiver that is capable of reacting to a remote control device, such as an IR or radio remote control device, in particular a remote control device compatible with a radio or television, so that the user may start-up the food or beverage preparation machine from a distance, in particular while he is sitting in front of his TV or nearby the radio. The liquid food or beverage preparation machines may of course be connected to a DVD or other media source so that the user can follow his favourite programs while he is preparing a liquid food or beverage.

The machine can be substantially formed by a main body having a rectangular front side being dominated by the user-interface screen and a foot portion larger than the top portion, so that the main body is tapering from the foot portion to the top portion. The main body may include at least one of: a drip tray having a support member for a receptacle to be filled with a liquid food or beverage, a capsule collector, and a liquid supply reservoir such as a water reservoir.

Moreover, the machine may have a liquid food or beverage outlet located above an area for receiving a receptacle to be filled, the outlet preferably being hidden by the user-interface screen. For instance, the outlet is located perpendicularly behind the user-interface screen. In fact, the entire area or a substantial part thereof can be located perpendicularly behind the user-interface screen.

Thus, in addition of providing a user-interface screen configuration on the machine that naturally and durably captures the user's attention, the machine's outlet, and optionally the receptacle located thereunder, may be hidden from the user's visual field so as avoid distraction of the user's attention by parts and/or operations of the machine other than those relating to the user-interface screen.

As already mentioned, the present invention relates to a machine connectable to a data-exchange network, the machine being configured for preparing a beverage in particular from a pre-portioned beverage ingredient in a capsule.

For this purpose, the machine comprises a communication module for connecting the machine to said network via a wired or wireless connection. The network to which the communication module is connectable may be the internet, an intranet, GSM network, UMTS network, Bluetooth network, infrared (IR) or a similar network to which one or more distant computers, servers and terminals are connected for communicating with the communication module of the beverage preparation machine. Hereby, the term "network" is intended to refer to a system comprising the machine according to the present invention and at least one further device, which are connected to each other via a communication link for one-directional or bi-directional communication. In case that a connection to more than one device is provided, the machine can also be connected to different devices via different types of communication networks.

Without controlling or participating to the control of the ingredient processing arrangement, the communication module may be configured in the beverage preparation machine to monitor certain aspects of the machine and, in particular, communicate such aspects onto the network to a remote server.

The machine further comprises a control unit for controlling all processes within the machine. In one embodiment, the control unit is arranged to communicate data to the communication module, the data relating to at least one of: the beverage preparation process; the ingredient processing arrangement; the control unit and/or beverage preparation settings. This information may then be communicated (or not) to a distant server and be processed for general or particular commercial or servicing or repair or counseling purpose.

In an even safer embodiment, the control unit is prevented from communicating with the communication module. In this case, the communication is not even unidirectional like above but inexistent. Hence, the control unit is configured to receive no signal at all from the communication module not even a signal for an information request. In this embodiment, no data communication channel is needed between the control unit and the communication module.

Typically, the ingredient processing arrangement comprises one or more sensors for measuring parameters of the status of the ingredient processing arrangement and/or the beverage preparation process. For instance, such sensors may include at least one of: temperature sensors, a pressure sensor, a flowmeter, an electric power sensor, an overheat sensor, a scale sensor, a water level sensor, an ingredient recognition sensor, etc . . . Such sensors are usually connected to the control unit.

In an embodiment, the communication module can be arranged to receive information from at least one of the sensor(s). The communication module may be directly connected to the sensors, usually in parallel to the control unit, or it may be indirectly connected to the sensor(s) via the control unit and typically be communicated a sensor-related information after processing by the control unit.

Normally, the control unit is connected to a beverage preparation user-interface. The user would use this user-interface to operate the ingredient processing arrangement via the control unit.

Typically, the communication module is connected to a communication user-interface. The user would use this user-interface to retrieve information from the network or retrieve information therefrom.

Such user-interfaces may include screens and touch screens, buttons, switches, etc . . . as known in the art.

Preferably, the control unit is connected to a beverage preparation user-interface and the communication module is connected to a communication user-interface, the beverage preparation user-interface and the communication user-interface being juxtaposed. In particular, the beverage preparation user-interface can be flush with the communication user-interface. The beverage preparation user-interface and the communication user-interface may be disposed in a single user-interface canvas. Hence, the disposition of the user-interfaces may be such as to appear like a single interface providing all the user-access to the control unit and the communication module.

Whereas the control unit and the communication module may be digitally and/or physically, entirely or partly, separated within the machine, the corresponding user-interfaces may be configured as an apparent single interface. Hence, the user is confronted with a single or concentrated user-interface arrangement to avoid the dispersion of his/her attention all over the beverage preparation machine.

Typically, the beverage preparation machine comprises a housing for housing: the ingredient processing arrangement; the control unit; and the communication module. This housing would normally also bear the user-interfaces.

For instance, the communication module is arranged to receive from the network and communicate via user-communication means, such as a display and/or loudspeaker, information relating to at least one of: a need to carry out a particular service; a need to repair said machine; and information on a particular ingredient that is being processed in said machine. When the communication module is configured to monitor the machine operation and/or components of the machine, the corresponding information may be communicated to a distant server of the network for evaluation and generation of suggestions to the user, for instance, via the communication module. For example, via appropriate sensor systems, the communication module may monitor the ingredient consumption and suggest timely reordering when the stock of ingredient is low or send general information regarding the ingredient or beverage that is being processed for display on the machine. Instead of a mere suggestion to reorder ingredients, e.g. proportioned ingredients capsules, the system may be configured to proceed to automatic re-ordering when the ingredient stock is low.

The communication module may be arranged for remote monitor of the service periods, for instance for carrying out a descaling process or for general maintenance. The communication module may communicate various parameters of the ingredient processing arrangement and the control unit for diagnosis purposes and/or for carrying out a market survey as to the user's preferences, for instance the actually used ratios of different ingredients. Hence, a distant server may monitor the preferred volume of beverage dispensing with certain ingredients, etc . . .

More generally, the communication module may be arranged to receive from the network and communicate via user-communication means, such as a display and/or loudspeaker, information relating to: handling of this type of machine by a user, e.g. provide an on-line user manual and/or beverage recipes; advertising relating to beverage preparation machines, accessories, one or more ingredients that are being processed or related products; general information relating to one or more ingredients for the beverage processing; and visualization and/or music for generating an ambiance relating to such beverages or preparations thereof or consumptions thereof; and news and/or weather forecast, etc . . . For example the communication module with the appropriate user-interface may be configured to permit distant ordering of ingredients via the network.

The beverage preparation machine can be arranged to automatically monitor the capsule consumption and send a capsule order to the supplier server whenever the automatic monitoring indicates a reaching of a shortage of consumable ingredient capsules at the customer location, the supplier server being arranged to receive the capsule order and to generate a corresponding instruction to prepare a shipment of a new stock of capsules for supply to the customer.

The beverage preparation machine may be arranged to communicate automatically the capsule consumption to the supplier server that is arranged to automatically monitor the capsule consumption and to generate the above instruction.

The machine's capsule extraction unit can be arranged to receive different types of ingredient capsules for preparing different beverages. For example, the extraction unit is arranged for receiving different coffee capsules types selected from capsules of arabica, robusta, canefora, etc . . . and blends thereof, e.g. the NESPRESSO™ capsule ranges of capsule types, of the in-home or the out-of-home beverage preparation machine standards.

In an embodiment, the beverage preparation machine has an automatic capsule recognition arrangement.

For example, the capsule recognition system is of the type disclosed WO02/28241 which discloses a coffee machine using capsules with a machine interpretable feature that can be read automatically by the machine via a sensor. The machine interpretable feature on the capsule may include one or more of a colour, a shape, a glyph, a text string a barcode, a digital watermark, symbols, notches, grooves or holes.

For instance, the capsule extraction unit is arranged to receive different types of ingredient capsules for preparing different beverages, the automatic capsule recognition arrangement being arranged to identify the type of the capsules that are being used.

Indeed, when different capsule types are likely to be used in the same extraction unit, it is not sufficient to count the number of extraction processes carried out to derive the remaining capsule stock. The types of capsules should be identified by the machine so as to provide a differentiated management system aligned to the different capsule types.

Figure 1A:
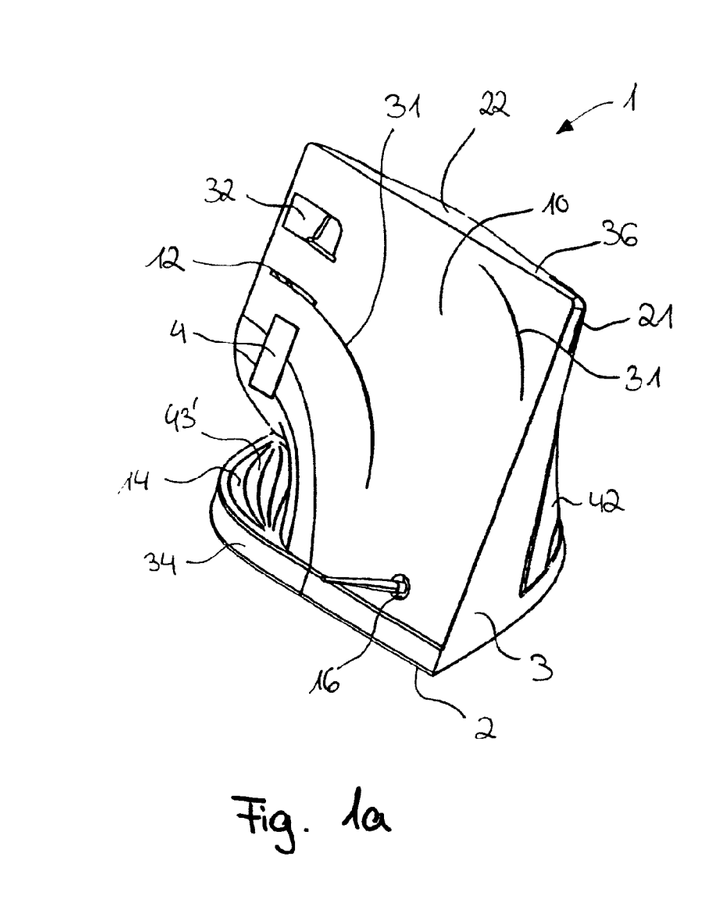
FIGS. 1a, 1b, 2a and 2b show different perspective views of a beverage preparation machine according to the present invention.
Figure 1B:
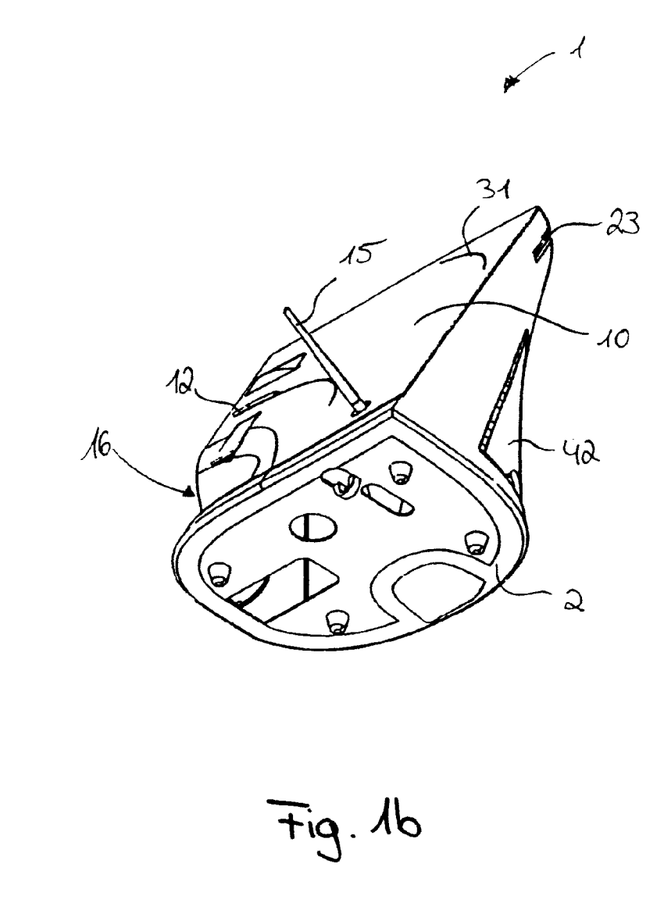
Figure 2A:
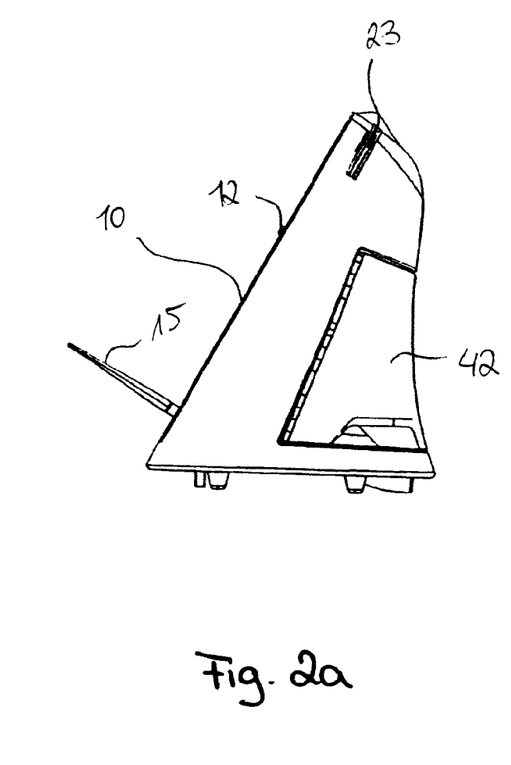
Figure 2B:
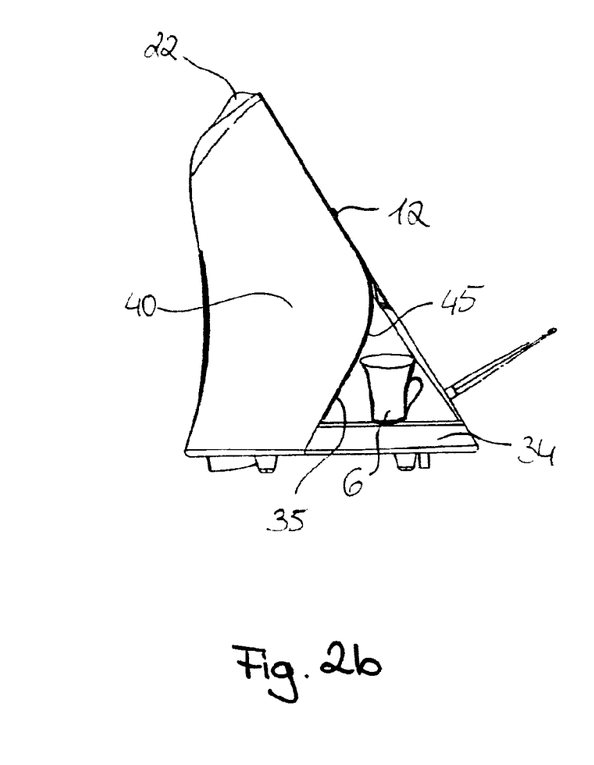

In the following with reference to FIGS. 1a, 1b, 2a and 2b the beverage preparation machine 1 according to the present invention and its basic functionalities will be described. FIG. 1a is a perspective top view of the beverage preparation machine 1, FIG. 1b is a perspective bottom view, FIG. 2a is a side view on a first side of the beverage preparation machine 1 and FIG. 2b is a side view on the second side of the beverage preparation machine.

In the following machine 1 will be described as a coffee preparation machine, however, it is noted that the present invention is not limited to a coffee preparation machine but comprises any other type of beverage preparation machine as previously explained.

Machine 1 has an arrangement 40 for processing one or more beverage ingredients to dispense a beverage, such as coffee. Arrangement 40 includes a reservoir 42 for liquid, preferably water, connected to a liquid circulation circuit with a pump, a heater and a coffee brewing unit, as known in the art. The brewing unit can be connected to a handle 4 pivotally mounted at housing 3 of the machine 1. Handle 4 is arranged to allow introduction, extraction and removing of a capsule containing a ground coffee. Upon extraction, capsules are evacuated to a used capsule collector after activating handle 4 again.

Additionally, machine 1 has a top portion 36 which may be used for holding spare cups. Top portion 36 may include a heating arrangement to preheat such spare cups. The cup heater may be of the resistive type, in particular a vapour circulation cup heater as known in the art, or any other suitable heating system. A spare capsule receptacle may also be located on top portion 36 of machine 1 for storing unused capsules.

Moreover, machine 1 has an outlet 45 from which the prepared beverage is dispensed into a receptacle or cup 6 placed underneath the outlet 45, as shown for example in FIG. 2b. A drip tray arrangement 34 is provided under outlet 45, for instance of the type disclosed in EP 1 731 065. For positioning cup 6 under outlet 45, drip tray may include a positioning arrangement at its surface 14 and/or walls 35 delimiting dispensing cavity may be positioned relative to outlet 45 to serve as references for a cup positioning, i.e. so that a cup 6 may simply be pushed against walls 35 to be properly positioned under outlet 45. Also provided is a used capsule collector (not shown in the figures) in a central part of machine 1 for collecting used, extracted capsules.

The machine further comprises a screen or display 10. Preferably, display 10 is a touch sensitive screen and may be operated by finger contact and/or with a stylus 15. Preferably, stylus 15 when not being used can be placed into a corresponding recess 16 within display 10 or any other part of machine 1.

Furthermore, display 10 is associated with a pair of buttons 12, for example for quick operation of machine 1 without having to access display 10. Moreover, in a preferred embodiment, display 10 includes a touch sensitive surface for navigating through pages and menus displayable on display 10.

Display 10 may be arranged to display various information and/or visual effects, as for example mentioned above, including network information when the machine is connectable to a user-network. Moreover, machine 1 may include a sound generating arrangement with loudspeakers and/or microphone and be a true multimedia interactive device, as discussed above. Machine 1 thereby may be used to contribute to the ambience.

In addition to display 10 and/or housing 3 may in particular have a series of holes 31 on its lateral, rear and/or upper sides, in particular within display 10, for the emission of light, of various colours, to create such an ambiance. For this purpose LEDs of various can be provided within the holes 31.

Unlike prior art beverage preparation machines, drip tray 34, capsule receptacle and reservoir 42 are removable from machine 1, in a movement underneath display 10 and that goes away from display 10 and/or generally parallel to the foot portion 2 of machine 1. The same applies to reservoir 42, which preferably is provided at the back of the machine beyond display 10. It follows that during use and after use, when the machine is serviced, e.g. drip tray 34 emptied, display is not exposed to parts of machine 1 that might project liquid, such as liquid food or beverage, against screen 10.

Furthermore, machine 1 has a capsule inlet arrangement 32 for the supply of capsules containing an ingredient of the liquid food or beverage to be prepared, such as coffee. The capsule inlet arrangement 32 can be either provided on the lateral side of the machine or can be provided within display 10. Preferably, the capsule inlet arrangement 32 is a recess within display 10 having the shape of a capsule or any other object related to the prepared beverage.

Display 10 of the machine has not an entirely flat surface but on one side when approaching the foot portion 2, provides a recess. The recessing walls 35 of display 10 together with cup support 14 of drip tray 34 thus provide a cavity 16 into which cup 6 can be placed to be filled with the beverage dispensed from outlet 45. To deemphasize the liquid food or beverage visual aspect of machine 1, walls 35 of display 10 within the cavity 16 can be used like a normal display, so that every object and/or image displayed on the display 10 extends onto cavity walls 35.

On top portion 26 or on any other part of the machine, a touch sensor 22 can be provided enabling the user to control the machine and/or to navigate through the menu functions by carrying out a corresponding touch operation on touch sensor 22. In case that display 10 is a mere display and not a touch screen, touch sensor 22 will make the control of the machine easier and more intuitive for the user. In case that display 10 is a touch screen, then the user has the choice whether to use display 10 or touch sensor 22 for carrying out the touch operation. However, it might be advantageous to use touch sensor 22 instead of the touch screen to avoid damage or contamination or dirt on display 10.

Machine 1 can further comprise a card reader/writer 23. The card reader/writer 23 can either be a slot, into which a card can be inserted to carry out a reading and/or a writing operation on the card, card reader/writer 23 can be a wireless interface enabling a wireless communication with a card, e.g. a radio frequency identification RFID card, or a combination thereof.

In order to provide an adjusted filling of the cup, an automatic filling system with a control of the level of fill may be implemented into the machine, for instance of the type disclosed in U.S. Pat. No. 4,458,735, WO97/25634 and WO99/50172.

Figure 3:
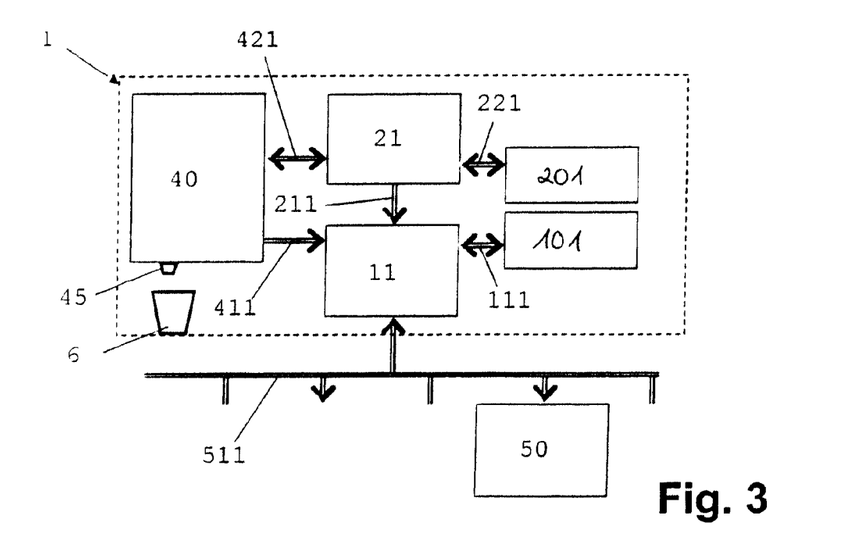
FIG. 3 shows a block diagram showing schematically the functional architecture of a beverage preparation machine according to the present invention being connected to a network.

FIG. 3 shows a functional block diagram of a beverage preparation machine 1 according to the present invention which is connected to a network 511.

Beverage preparation machine 1 includes a control unit 21 connected to a user-interface 201 via a bi-directional data communication channel 221. Control unit 21 is connected to the ingredient processing arrangement 40 for controlling the processing of the beverage ingredients. Typically, control unit 21 will control the powering of a heater and a pump and adjust the powering based on measured parameters of the beverage preparation process via sensors, such as temperature sensors, pressure sensors and flowmeters. Moreover, the control of the components of the ingredient processing arrangement 40 may be adjusted to the type of ingredient capsule extracted upon automatic recognition thereof via a capsule recognition system as known in the art, for instance an electromagnetic, mechanical, colour or barcode recognition system.

Hence, ingredient processing arrangement 40 includes a series of sensors for returning information to control unit 21 relating to the state of arrangement 40 and of the beverage preparation process. Communication between control unit 21 and beverage preparation 41 is achieved via a bidirectional communication channel 421.

Furthermore, beverage preparation machine 1 has a communication module 11 for bidirectional communication with an external network 511, such as the internet or an intranet. Communication module 11 is connected to a user-interface 101, preferably in the form of the above mentioned display 10, preferably a touch screen, and possibly one or more buttons 12, via a bidirectional data communication channel 111. Display 10 in case of a touch screen may be operated by finger touch or by way of stylus 15.

Control unit 11, communication module 21 and ingredient processing arrangement 40 are all contained within the housing of beverage preparation machine 1.

In accordance with the invention, communication module 11 is permanently prevented from controlling the processing of the beverage ingredients. In other words, communication module 11 of beverage preparation machine 1 may not act directly or indirectly via control unit 21 on arrangement 40 or affect the beverage preparation process or other processes carried out by arrangement 40.

Control unit 21 is prevented from accepting beverage preparation-related control data from communication module 11.

In the architecture of FIG. 3, control unit 21 is arranged to communicate data to communication module 11 via unidirectional data communication channel 211. With the exception of a request for information and the signals necessary to ensure proper communication, e.g. data transmission control signals, control unit 21 will not receive any data from communication module 11. Conversely, the data transferred from control unit 21 to communication module 11 may relate to at least one of: the beverage preparation process; ingredient processing arrangement 40; beverage preparation settings stored in control unit 21; and/or the state of control unit 21, e.g. in the view of identifying any malfunctioning at a station 50 remotely connected to network 511.

It is also possible to connect communication module 11 directly to the sensors in the beverage preparation module 40. Likewise, communication between beverage preparation module 40 and communication module 11 is unidirectional via bus 411. However, this communication channel may become redundant if the data relating to the beverage preparation module 40 can be communicated to communication module 11 via control unit 21. Communication channel 411 is particularly useful in the absence of communication channel 211, for instance when control unit 21 should benefit from an increased protection against network 511.

Communication module 11 is arranged to receive from said network and communicate via user-communication interface, such as display 10 and/or loudspeaker, information relating to at least one of: a need to carry out a particular service, e.g. descaling; a need to repair said machine; and information on a particular ingredient that is being processed in said machine. For such information to be sent to communication module 11, corresponding information is first gathered together by communication module 21 from control unit 21 and/or ingredient processing arrangement 40 and sent to a remote server 50 that processes and analyses the information before returning, when appropriate warnings or other information to communication module 11 via network 511.

In another embodiment, control unit 21 is prevented from communicating at all with communication module 11, not even unidirectionally. There is no data communication channel between control unit 21 and communication module 11.

The highest degree of safety is achieved when communication module 11 is connected neither to control unit 21 nor to beverage preparation module 40. A slightly inferior protection is achieved when communication module 11 is allowed to read, via a unidirectional channel, sensors of beverage preparation module 40. A still lower safety is obtained when communication module is allowed to obtain information from control unit 21. To ensure immunity against any upsetting of ingredient processing arrangement 40 and control unit 21 via network 511, the possibility, in particular any physical possibility, for communication module 11 to change parameters of the control unit 21 or beverage preparation unit 40 should be avoided.

As shown in FIGS. 1a and 1b, beverage preparation user-interface 201 is flush with communication user-interface 101 and implemented as a combination of display 10, buttons 12, holes 31 comprising LEDs or the like, loudspeakers, microphones or the like.

A master switch for machine 1 is also provided (not shown in the Figures). The master switch is arranged to connect and disconnect the powering of the various components of the beverage preparation machine, including communication module 11, control unit 21 and ingredient processing arrangement 40 all powered by the same power source, typically the mains.

Generally, communication module 11 can be arranged to receive from the network 511 and communicate via user-communication interface, such as a display 10 and/or loudspeaker, information relating to: handling of such machine 1 by a user; advertising relating to such machine 1 or related machines, accessories, and/or one or more ingredients for the beverage processing; general information relating to one or more ingredients for the beverage processing; visualization and/or music for generating an ambiance relating to said beverage or preparation thereof or consumption thereof; and news and/or weather forecast.

Figure 4:
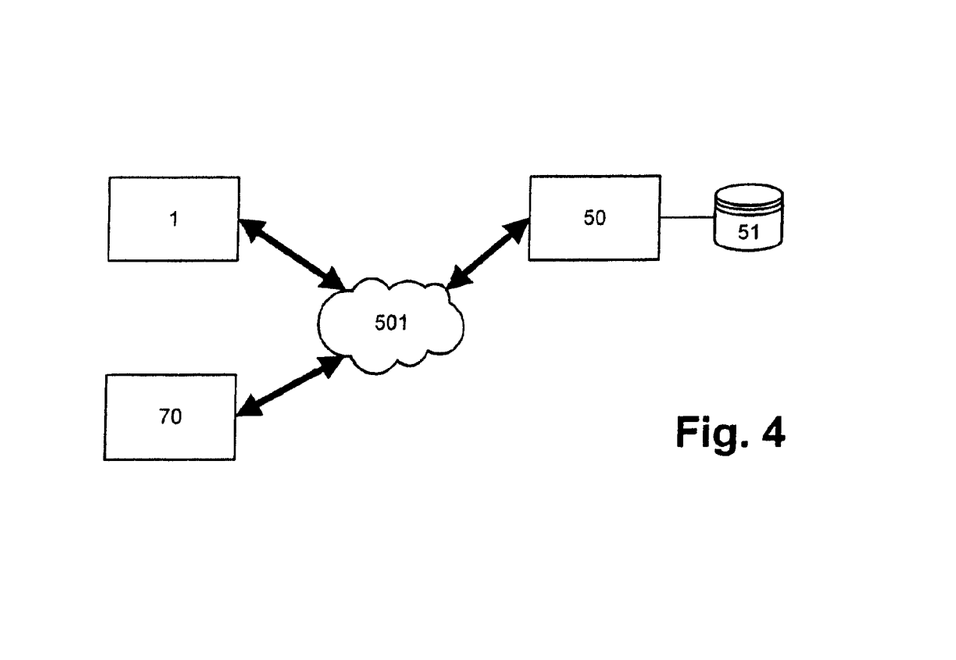
FIG. 4 shows a block diagram showing schematically the functional architecture of a network comprising a beverage preparation machine according to the present invention.

FIG. 4 shows a network comprising a machine 1 according to the present invention having network capabilities. Connected to communication network 501 is also a server 50, which for example can be associated to a capsule supplier. Server 50 can be further connected to a database 51 comprising data on users, capsules, machines, capsule consumption or the like.

A user device 70 can further be connected to the network 501. Such a user device 70 can for example be a notebook, PC, mobile phone, PDA or any other user device having network communication capabilities.

Via user device 70 the user can for example submit data, programs or information to the machine 1. For example he can load new or updated software or data into machine 1. He can also change the settings of the machine remotely. Depending on the degree of communication possibilities between control module 21 and communication module 11, the user can also remotely start, stop or change a beverage preparation process. The user via user device 70 can also log into server 50 in order to change his personal user configurations, to submit a capsule order, to send a request for support or information or the like.

Even though in FIG. 4 network 501 is shown as one single network connecting machine 1, server 50 and user device 70, it is also possible that the different devices communicate via one or more separate network. Any type of network can be possible including a public or a private network, for example via bluetooth, infrared, GSM, UMTS, internet or any other type of wired or wireless communication network.

Specifically, an intermediate device such as a telemetry device can be provided between machine 1 and network 501 in order to convert the corresponding data which are transmitted. The communication between respectively two of the devices, i. e. machine 1, server 50 and user device 70 can be one- or bidirectional.

With the present invention a virtual shopping functionality for goods related to the beverage preparation machine is provided. Machine 1 in the present invention comprises a screen 10, which is a central element for the virtual shopping environment.

According to the present invention, machine 1 is adapted to provide the virtual shopping functionality enabling the user to purchase and order goods related to machine 1 directly by operating machine 1 itself without having to use further devices. Thereby, if the user during the use of machine 1 notices that there is the need for any machine-related products, such as for example new capsules, spare parts, descaling kits, accessories related to the preparation of the beverage, then he can at once use machine 1 for purchasing such goods. This makes the purchase quicker and simpler.

Further, due to the network capability of machine 1 according to the present invention, machine 1 is enabled to communicate via network with an external server 50 of a vendor of the machine-related goods, which makes the concept of using machine 1 itself for ordering products possible. Machine 1 can thus submit to server 50 and receive from server 50 all information necessary for accomplishing the order, such as a list of goods selected for purchase, a purchase confirmation, submission of data related to a user account and the like.

According to the present invention, for making the shopping more intuitive for the user, the shopping environment is made as realistic as possible. For this purpose an image of the interior of a shop offering goods related to the machine is displayed on the touch screen 10.

Preferably, this virtual interior of a shop offering these goods corresponds to the interior of a physical (existing) shop offering such goods, in particular to the interior of a shop of a chain of shops having a standardized presentation of such goods. For example, the interior of the shops may be the interior of a Nespresso boutique with its typical presentation of goods, in particular coffee capsules. Hence, a user who knows the interior of physical shop(s) where goods relating to machine 1 may be purchased will be able to immediately make the relationship between the virtual shopping environment displayed on machine 1 and the physical shops. This improves the intuitiveness of the shopping process.

Further, a container, such as a shopping bag, is also displayed on touch screen 10. In reality, when being in a shop, the user would take a good out of the shelf and put it into his shopping bag. To create this feeling, the present invention provides the possibility of selecting a good for purchase by accomplishing a touch operation on the graphical representation of a good on the touch screen 10 and on the graphical representation of the container on touch screen 10. The user thus by a corresponding touch operation on touch screen 10 gets the feeling to selecting a good and putting it into the container. In the following description, when reference is made to a touch operation on a good or the like on the display, then it is always intended to refer to a touch operation on the corresponding graphical representation of the good or any other object on the display.

Figure 5:
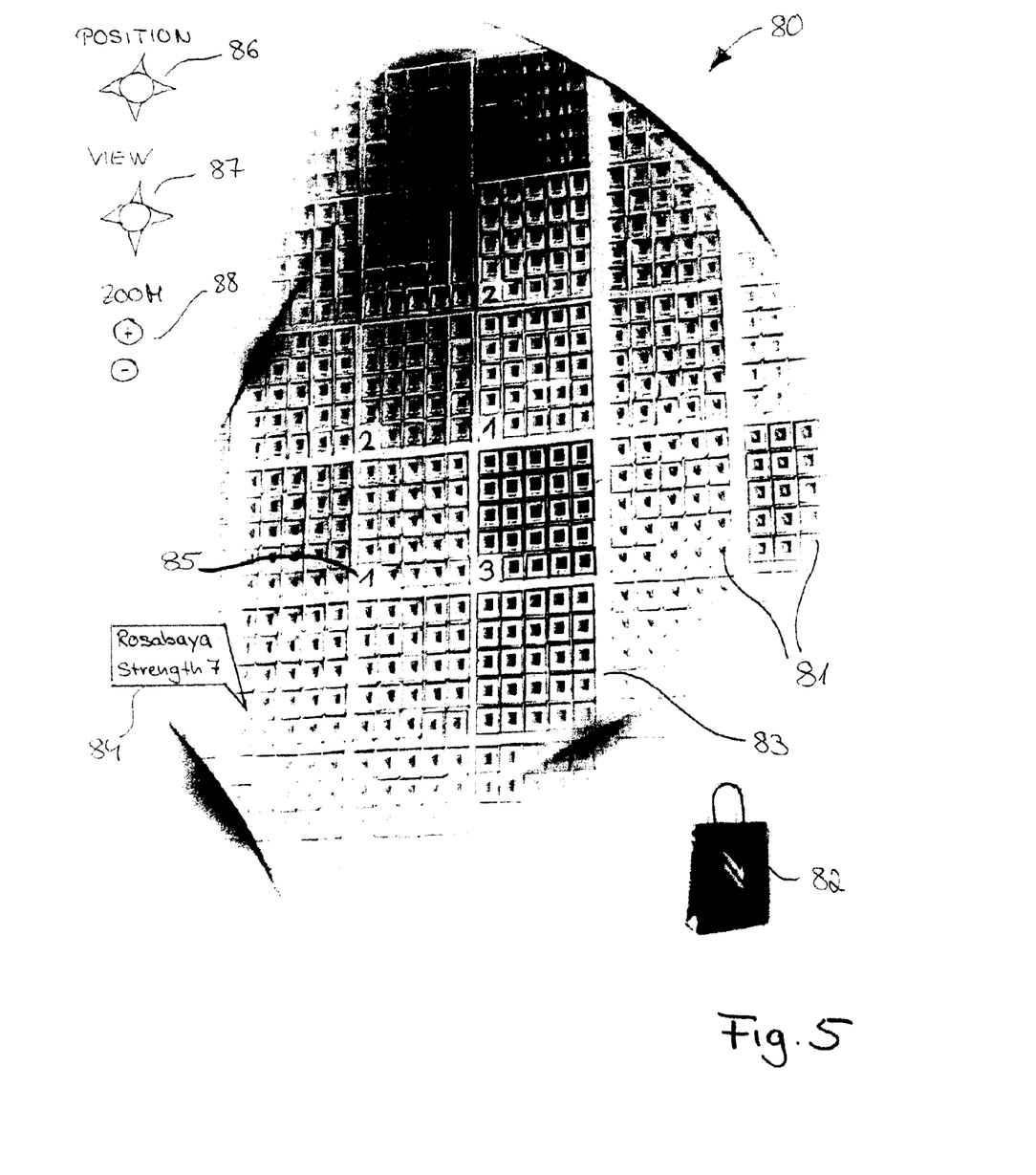
FIG. 5 is an embodiment of a virtual shopping environment according to the present invention.

A non-limiting embodiment of a virtual shopping environment is shown in FIG. 5. This embodiment is an example of an image which could be displayed on the touch screen 10 of the machine 1.

For the virtual shopping environment an image 80 of the interior of a shop offering goods 81 related to machine 1 are shown. Also displayed is a container 82, preferably in the shape of a shopping bag. Touch screen 10 is adapted to detect a touch operation by a user and to submit the touch operation information to a control unit 21 of machine 1. If a touch operation on a good 81 on touch screen 10 and on container 82 is detected then information of the respective good is submitted to a storage for storing the good within a list of selected goods.

In other words, when touching a displayed good 81 on the display and further touching container 82, the user adds the corresponding good 81 to his shopping bag and thus to a list of goods he intends to purchase. He thereby has the impression of directly taking the good out of the shelf or any other part of the shop and putting it into his container or shopping bag.

Several possibilities of carrying out such a touch operation can be provided. A first possibility is selection of a good for purchase is accepted if a first touch is carried out on good 81 and then a second subsequent touch is carried out on container 82.

A second possibility is the selection of a good for purchase by a sliding touch operation starting at good 81 and going to container 82. The user thereby carries out a dragging operation from good 81 to container 82. This even enhances the impression for the user of taking a good and putting it into his shopping bag.

Of course, any other type of touch operation is possible which allows identifying the good and the intention of the user to put it into the container 82.

It is to be noted that the term "goods related to the machine" intends to cover products, which are needed for use and/or maintenance of the machine itself, as well as products, which are additional objects and/or devices serving as accessories for the machine and/or the preparation of the beverage.

Several additional functions are provided for enhancing the impression of being in a shop selling goods related to machine 1, which will be explained in the following with reference to FIG. 5.

When displaying an interior 80 of a shop, a real shop impression can be created by displaying a shelf having therein stored several goods. Preferably, there are groups of goods, whereby each group contains the same types of goods. In FIG. 5 a shelf 83 is shown comprising compartments having a rectangular cross-section, whereby into each compartment one different type of goods is stored.

In a preferred embodiment, machine 1 is a capsule based machine for the preparation of hot beverages, such as coffee and the virtual shopping environment amongst others shows boxes containing at least two capsules. Preferably, boxes containing different types of capsules are displayed in a different color and/or on a different position. For example, as shown in FIG. 5, boxes containing one type of capsules are provided within one compartment of the shelf.

The user can request additional information by simply touching on a good 81 on touch screen 10, then an additional information field 84 will be displayed informing the user on the properties of the displayed good 81. As an example in FIG. 5, if the user carries out a touching operation on one of the boxes containing capsules for preparing coffee, an information window 84 will show the name of the coffee type, for example "Rosabaya" and optionally additional information, such as for example the strength of the coffee. Alternatively or additionally, when touching a good 81 on the touch screen 10 the good 81 can be shown in an enlarged view, which optionally can also be turned around an viewed from different sides by corresponding touch operations. The information window 84 and/or the enlarged view of good 81 can either disappear automatically after a predefined time or can only disappear after the user touches again on the same good 81 and/or on another type of good 81.

In order to further emphasize the impression of being in a real shopping environment, the user can be enabled to change his viewing position, his viewing angle and/or the zoom rate. For this purpose corresponding icons or symbols 86, 87, 88 can also be displayed on touch screen 10. In the embodiment shown in FIG. 5, a position button 86, a viewing angle button 87 and a zoom rate button 88 are provided.

Position button 86 serves for changing the virtual position of the user within the shop. The user thus, by operating the position button 86, has the impression of walking along the shelves or the goods within the shop. In order to keep a realistic impression, the position button 86 may comprise only two directions, i. e. a left and a right direction and no up and down direction. However, it is also possible to additionally provide an up and down direction creating the impression of the user of climbing up and downwards along the shelves.

View button 87 serves for changing the view angle of the user on the goods without changing his position. This would correspond to a turning of the head or the body around in the shop when staying at the same position.

A zooming button 88 allows to change the zooming rate, i. e. to go nearer or to go farther away from the displayed goods 81.

Figure 6:
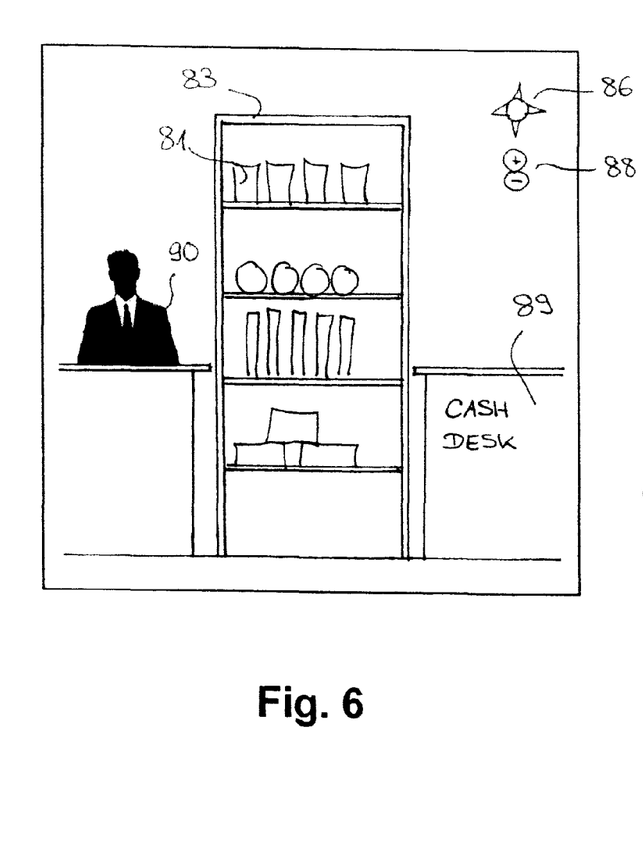
FIG. 6 is another embodiment of a virtual shopping environment according to the present invention.

A further embodiment will be explained with reference to FIG. 6. In FIG. 6, the interior of a virtual shop is shown. As already explained, there can be provided goods 81 which preferably are stored within a shelf 83 or the like. There can also be provided buttons 86, 88 for changing position, view angle and/or zooming rate.

Additionally, in order to further enhance the impression of a real shopping environment, a cash desk 89 can be indicated and/or a shop assistant 90 can also be shown.

The user thus when touching the cash desk 89 triggers the process of confirming the list of selected goods for purchase and of processing with the order.

If the user touches shop assistant 90, then for example an automatic help menu may pop up helping the user for deciding which goods to buy, informing the user of new goods and/or providing any other function of a shop assistant within a real shop.

Figure 7:
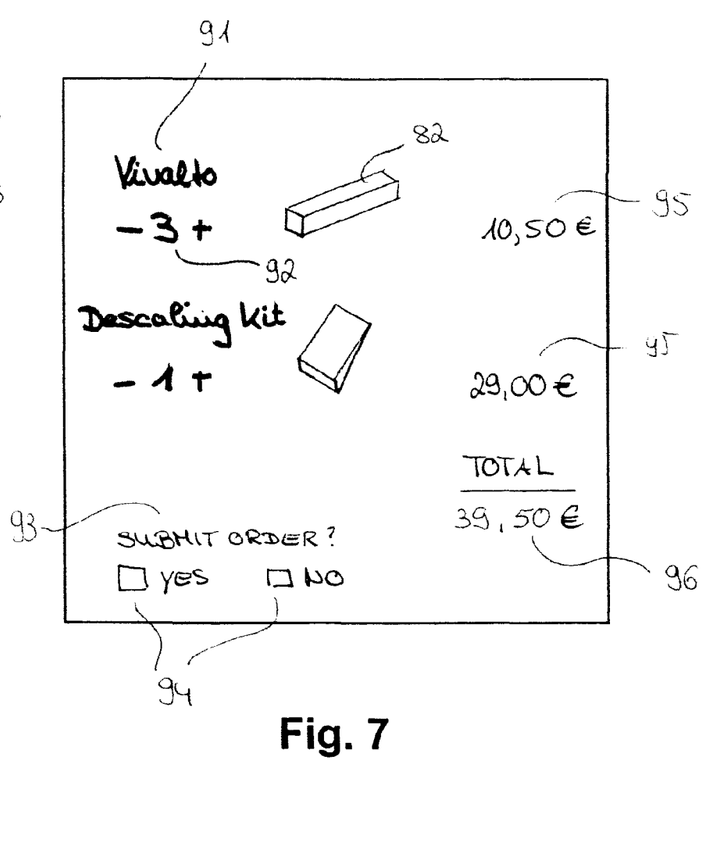
FIG. 7 is an example of a display for submitting an order.

FIG. 7 shows an example of a menu displayed after having selected the cash desk 89 or after having in any other way indicated the end of the shopping and the wish to continue with the purchase and final order. In this menu, the selected goods 81 are displayed with the name 91 and the number 92 of each good. A sum 95 for each good indicates the costs of all goods of the same type and a total sum 96 indicates the total costs of the present purchase.

Text message 93 asking the user whether he wants to submit the order is further displayed together with buttons 94 allowing the user to decide whether or not to submit the order.

According to the present invention, due to its network capability, machine 1 can communicate via a network 511, 501 with an external server 50 of a vendor. Hereby, there are several possibilities, when the communication is set up and which information is transmitted.

Image 80 of the shop interior including the different goods can either be stored in a storage of the machine, so that for displaying image 80 of the shop no communication between machine 1 and external server 50 has to be set up. Alternatively, machine 1 can set up a communication with server 50, so that the user, via machine 1, can access the shop site offered by the server 50.

When control unit 21 detects the selection of a good 81 for purchase, then the selection of the corresponding good 81 can be either stored in an internal storage of machine 81 or can be directly submitted to a storage within server 50 of the vendor. If the goods are stored in an internal storage, then no need of a permanent communication with external server 50 is necessary.

However, at the latest when the user indicates that he wishes to confirm his purchase request, a communication is set up between machine 1 and server 50, for submitting the purchase request, optionally to check on the server side the account of the user stored in database 51 and to display a purchase confirmation issued by the vendor.

The server 50 in turn is adapted to manage the purchase requests received by the beverage preparation machine 1 according to the present invention. This may include reception of a purchase request via the communication network 511, 501, 502, looking up user or customer data in the database 51, sending a purchase request to the beverage preparation machine, issuing an instruction for shipment of the purchased goods and arranging payment of the purchased goods.

Figure 8:
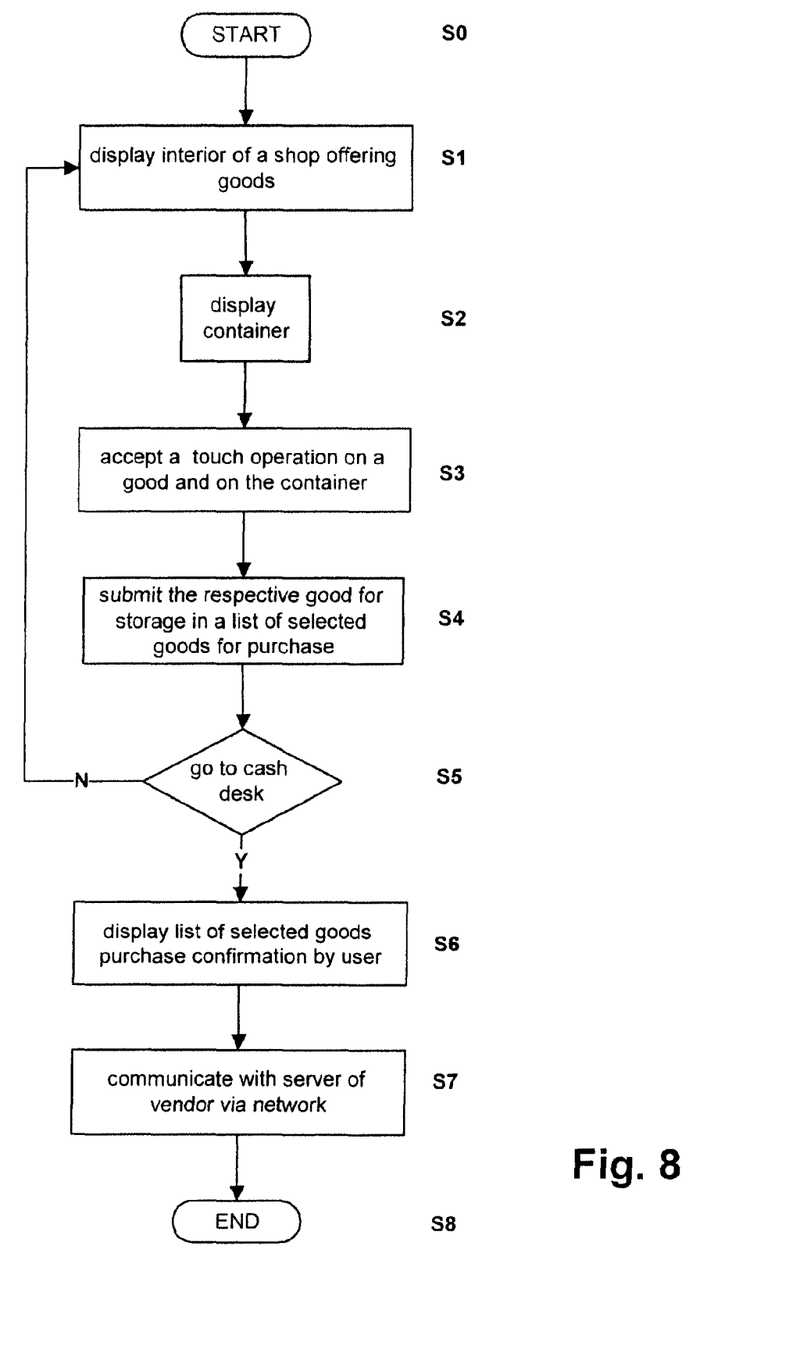
FIG. 8 is a flowchart showing the process steps of the method according to the present invention.

An overview of the steps according to the method of the present invention will be given with reference to FIG. 8.

The process starts in step S0. In step S1, the interior of a shop offering goods is displayed. In the next step S2, which can be prior or concurrently to step S1, a container, preferably a shopping bag, is displayed.

In step S3, a touch operation is accepted on a good and on the shopping container. In the next step S4, the information of the respective good is submitted to a storage storing a list of selected goods for purchase.

In the next step S5, the activation of the cash desk function is checked. If the cash desk function is not activated then the process continues with step S1, i.e. with the display of goods. Otherwise, if the cash desk function in step S5 is activated, then in step S6 the purchase menu will be shown displaying a list of selected goods for purchase to be accepted or discarded by the user.

In step S7, it is schematically indicated that a communication is set up between machine 1 and server 50. However, as previously explained, this step can also be provided once or more within the process at different time points depending on the settings regarding the virtual shopping environment.

The process ends in step S8.

The invention claimed is:

1. A beverage preparation machine with a virtual shopping functionality, the beverage preparation machine comprising:
   an arrangement configured to process a beverage ingredient to dispense a beverage according to a purchase request, the arrangement comprising a liquid reservoir connected to a liquid circulation circuit comprising a pump, a heater and a brewing unit,
   an outlet from which the beverage is dispensed,
   a touch screen,
   a control unit, the touch screen is configured to display a graphical representation of an interior of a shop offering goods related to the beverage preparation machine on the touch screen, display a graphical representation of a container on the touch screen, and submit information on a touch operation to the control unit, the control unit is configured to accept selection of a selected good for purchase from the goods upon detecting a touch operation on the graphical representation of the selected good on the touch screen and on the graphical representation of the container on the touch screen, and the goods are boxes comprising at least two capsules, each of the at least two capsules having therein ingredients for preparing the beverage, the boxes comprising different types of the at least two capsules with a different color and/or at a different position on the touch screen, the selection of the selected good for purchase identifying one of the different types of the at least two capsules, and the control unit configured to send from the beverage preparation machine to a remote server the purchase request for the identified type of the at least two capsules entered at the beverage preparation machine.

2. The beverage preparation machine of claim 1, wherein the control unit is configured to submit information of the selected good to a memory for storing a list of goods selected for purchase.

3. The beverage preparation machine of claim 1, further comprising a communication module for submitting information of the selected good to a server of a vendor of the selected good via a communication network.

4. The beverage preparation machine of claim 1, wherein the control unit is configured to detect as the touch operation a sliding touch operation from the graphical representation of the selected good to the graphical representation of the container.

5. The beverage preparation machine of claim 1, wherein the control unit is configured to detect as the touch operation a sequential operation comprising a first touch on the graphical representation of the selected good on the touch screen and a subsequent second touch on the graphical representation of the container on the touch screen.

6. The beverage preparation machine of claim 1, wherein the touch screen is configured to display a shelf within the shop having therein several groups of a same type of the goods.

7. The beverage preparation machine of claim 6, wherein the touch screen is configured to display information on each type of the goods upon a touch on the respective type of good on the touch screen.

8. The beverage preparation machine of claim 6, wherein the touch screen is configured to display for each type of the goods a quantity purchased by a user in a last order.

9. The beverage preparation machine of claim 1, wherein the touch screen is configured to display icons for changing at least one view selected from the group consisting of a view angle, a zooming rate and a viewing position with respect to the interior of the shop based upon a corresponding touch operation on the icons.

10. The beverage preparation machine of claim 1, wherein the touch screen is configured to display a graphical representation of a shop assistant on the touch screen, and the control unit is configured to provide a help menu to a user upon a touch operation on the graphical representation of the shop assistant.

11. The beverage preparation machine of claim 1, further comprising a communication module for communicating with a remote server of a vendor of the selected good via a communication network, wherein the touch screen is configured to display a graphical representation of a cash desk on the touch screen, and the communication module is configured to submit a purchase request for the selected good to the remote server upon a touch operation on the graphical representation of the cash desk.

12. A method for operating a server via a communication network in communication with a beverage preparation machine, the method comprising:

operating a beverage preparation machine having a virtual shopping functionality to select and create a beverage, the beverage preparation machine comprising (i) an arrangement configured to process a beverage ingredient to dispense a beverage, the arrangement comprising a liquid reservoir connected to a liquid circulation circuit comprising a pump, a heater and a brewing unit, (ii) an outlet from which the beverage is dispensed, (iii) a touch screen and (iv) a control unit, the touch screen creating a graphical representation of an interior of a shop offering goods related to the beverage preparation machine on the touch screen, create a graphical representation of a container on the touch screen, and submit information on a touch operation to the control unit, the control unit accepting selection of a selected good for purchase from the goods upon detecting a touch operation on the graphical representation of the selected good on the touch screen and on the graphical representation of the container on the touch screen, and the goods are boxes comprising at least two capsules, each of the at least two capsules having therein ingredients for preparing a beverage, the boxes comprising different types of the at least two capsules with a different color and/or at a different position on the touch screen, and the selection of the selected good for purchase identifying one of the different types of the at least two capsules, sending from the beverage preparation machine to a remote server a purchase request for the selected good entered at the beverage preparation machine; and preparing the beverage by the beverage preparation machine according to the purchase request.

13. The method of claim 12, further comprising:

receiving a purchase confirmation from the remote server on the beverage preparation machine, the remote server is associated with a vendor of the selected good; and preparing a shipment of the identified type of the at least two capsules to a customer of the beverage preparation machine.

14. A non-transitory computer-readable medium comprising instructions stored thereon executable by a control unit of a beverage preparation machine, wherein the instructions when being executed cause the beverage preparation machine to perform the steps of:

processing a beverage ingredient to dispense a beverage from an outlet of the beverage preparation machine by operating an arrangement comprising a liquid reservoir connected to a liquid circulation circuit comprising a pump, a heater and a brewing unit;

displaying a graphical representation of an interior of a shop offering goods related to the beverage preparation machine on a touch screen of the beverage preparation machine, the graphical representation corresponds to an interior of a physical shop offering a same type of the goods; and accepting selection of a selected good for purchase from the goods by a touch operation on the touch screen, the goods are boxes comprising at least two capsules, each of the at least two capsules having therein ingredients for preparing a beverage, the boxes comprising different types of the at least two capsules with a different color and/or at a different position on the touch screen, and the selection of the selected good for purchase identifying one of the different types of the at least two capsules, sending from the beverage preparation machine to a remote server a purchase request for the selected good entered at the beverage preparation machine; and preparing the beverage by the beverage preparation machine according to the purchase request.

* * * * *